Mar. 6, 1923.
J. C. HEILMAN
BONBON COATING MACHINE
Filed Feb. 26, 1919
1,447,549
4 sheets-sheet 1
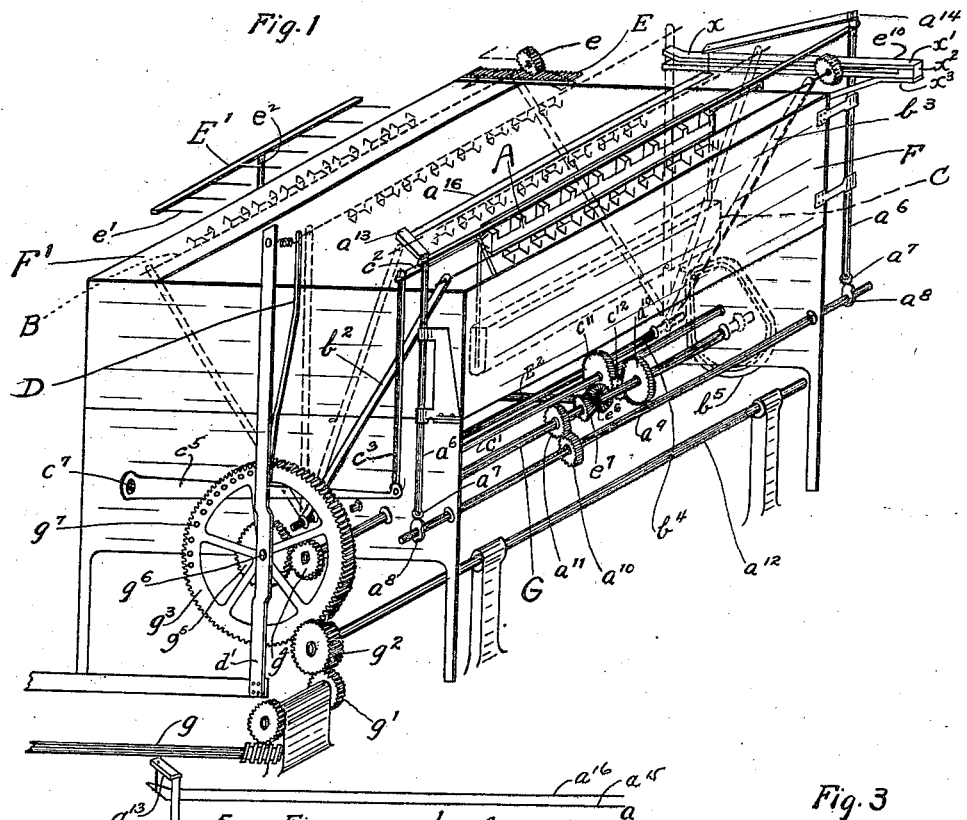
Fig. 1
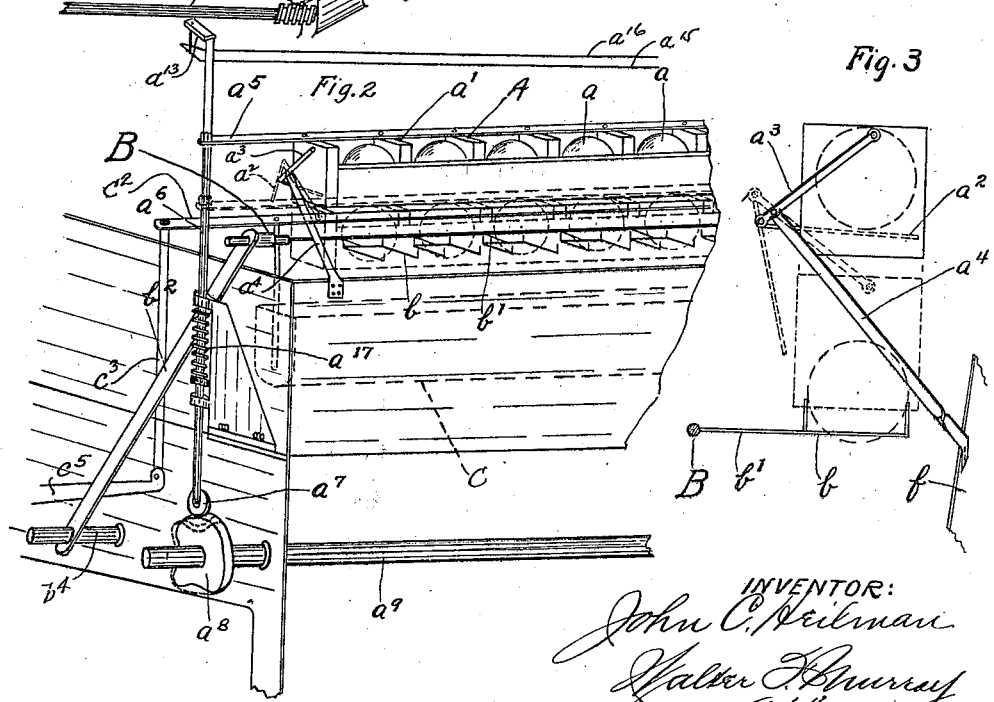
Fig. 2
Fig. 3
INVENTOR:
John C. Heilman
Walter H. Murray
Atty.

Mar. 6, 1923.

J. C. HEILMAN 1,447,549

BONBON COATING MACHINE

Filed Feb. 26, 1919

INVENTOR:
John C. Heilman
Walter F. Murray
Atty.

Mar. 6, 1923. 1,447,549
J. C. HEILMAN
BONBON COATING MACHINE
Filed Feb. 26, 1919  4 sheets-sheet 3
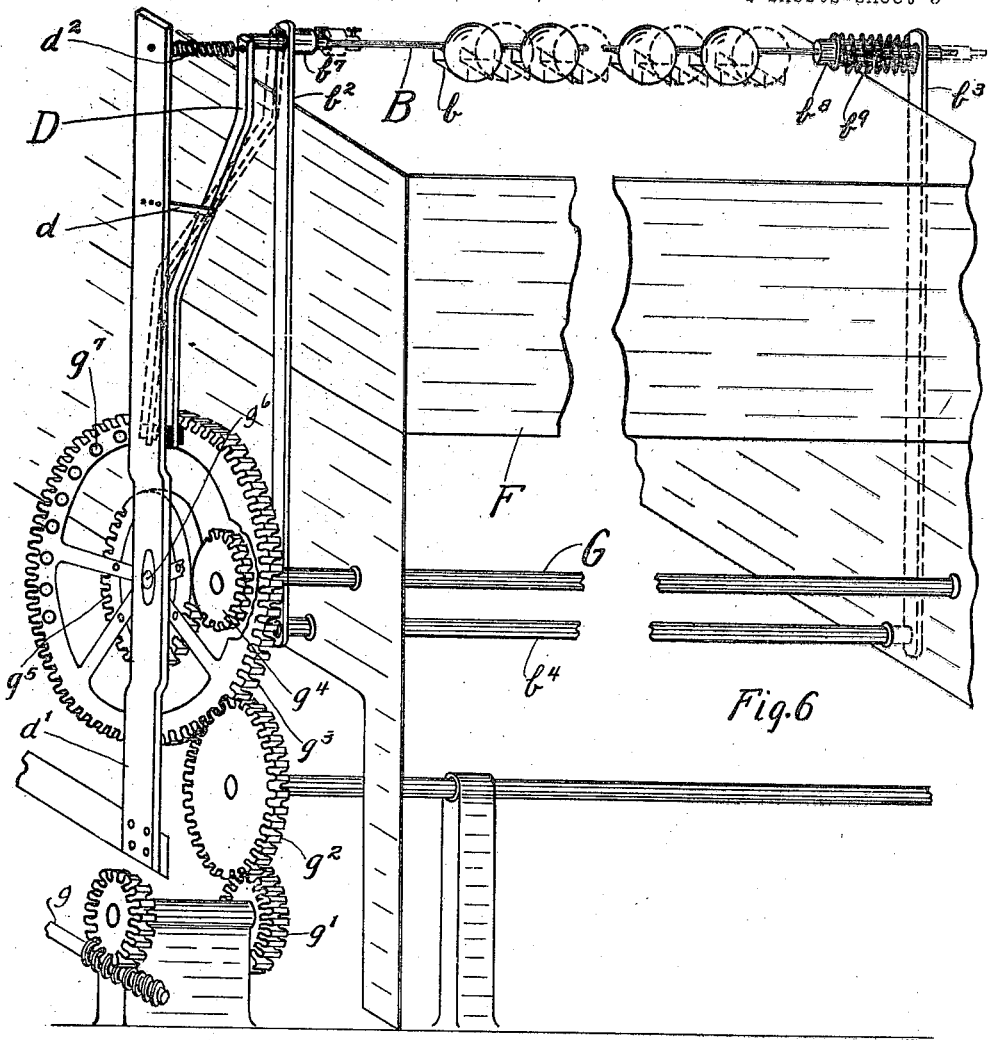
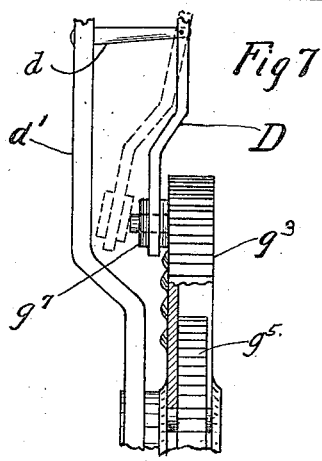
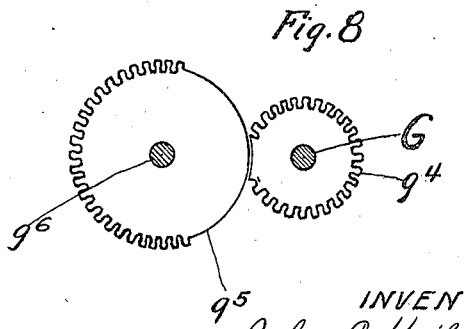
INVENTOR:
John C. Heilman Mar. 6, 1923.
J. C. HEILMAN
BONBON COATING MACHINE
Filed Feb. 26, 1919

INVENTOR:
John C. Heilman
Walter F. Murray
Atty.

Patented Mar. 6, 1923.

1,447,549

UNITED STATES PATENT OFFICE.

JOHN C. HEILMAN, OF CINCINNATI, OHIO.

BONBON-COATING MACHINE.

Application filed February 26, 1919. Serial No. 279,283.

*To all whom it may concern:*

Be it known that I, JOHN C. HEILMAN, a citizen of the United States of America, and a resident of Cincinnati, in the county of Hamilton and State of Ohio, have invented a new and useful Improvement in Bonbon-Coating Machines, of which the following is a specification.

My invention relates to a machine for receiving a series of candy confections, dipping them into a coating fluid, removing them therefrom, shaking off the superfluous coating and depositing them upon a shelf for drying.

The coating fluid, which is used for this purpose, is one which is sticky and quick to dry. It is therefore difficult to handle the confections, and to give them a uniform coating.

It is the object of my invention to provide a machine by means of which bon-bons may be coated quickly and uniformly.

This object is attained by the means described in the specification and illustrated in the accompanying drawings, in which:—

Fig. 1, is a perspective view of a bon-bon coating machine embodying my invention, the dotted line showing various positions of the conveyer, which carries the bon-bons during the coating, shaking and discharging operations.

Fig. 2, is a detail perspective view of the filling device and the conveyer.

Fig. 3, is a side elevation of the filling device, the full line showing the position thereof for receiving the bon-bons, and the dotted line the position thereof in depositing the bon-bons upon a basket.

Fig. 6, is a detail perspective view of the mechanism for shaking the superfluous coating from the bon-bons.

Fig. 7, is a detail elevation of the mechanism for performing the shaking operation.

Fig. 8, is a side view of the gears, which permit the travel of the conveyer to be interrupted during the shaking operation.

Figure 4:
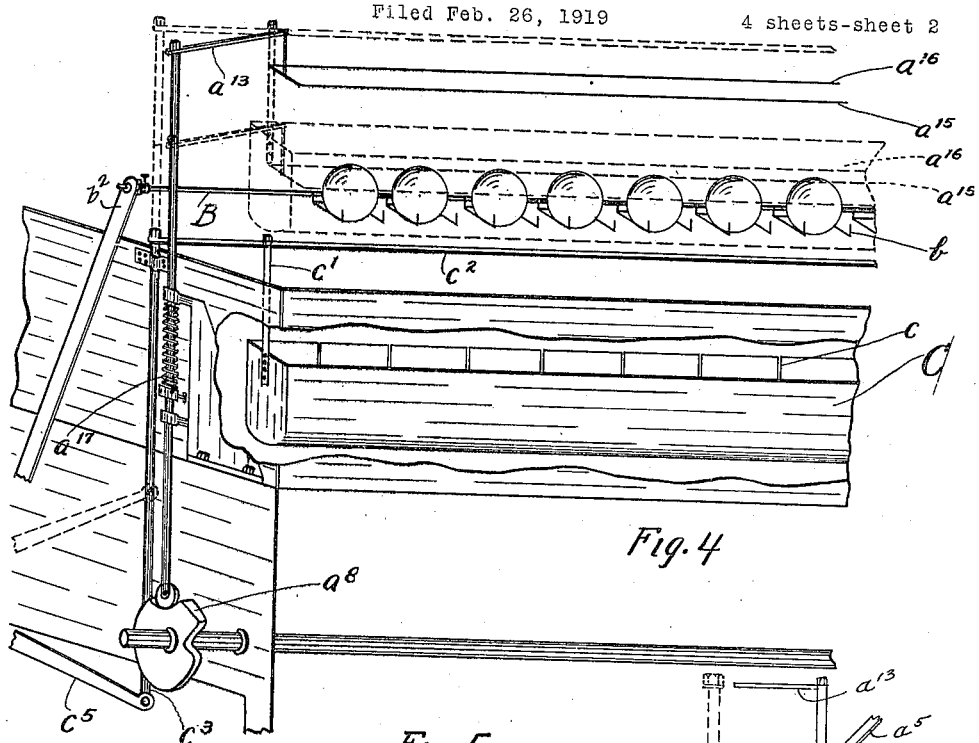
Fig. 4, is a detail perspective view of the liquid trough and the conveyer, the full line showing the position of the trough and the conveyer before the dripping operation, and the dotted lines showing the position of the parts during the dipping operation.
Figure 5:
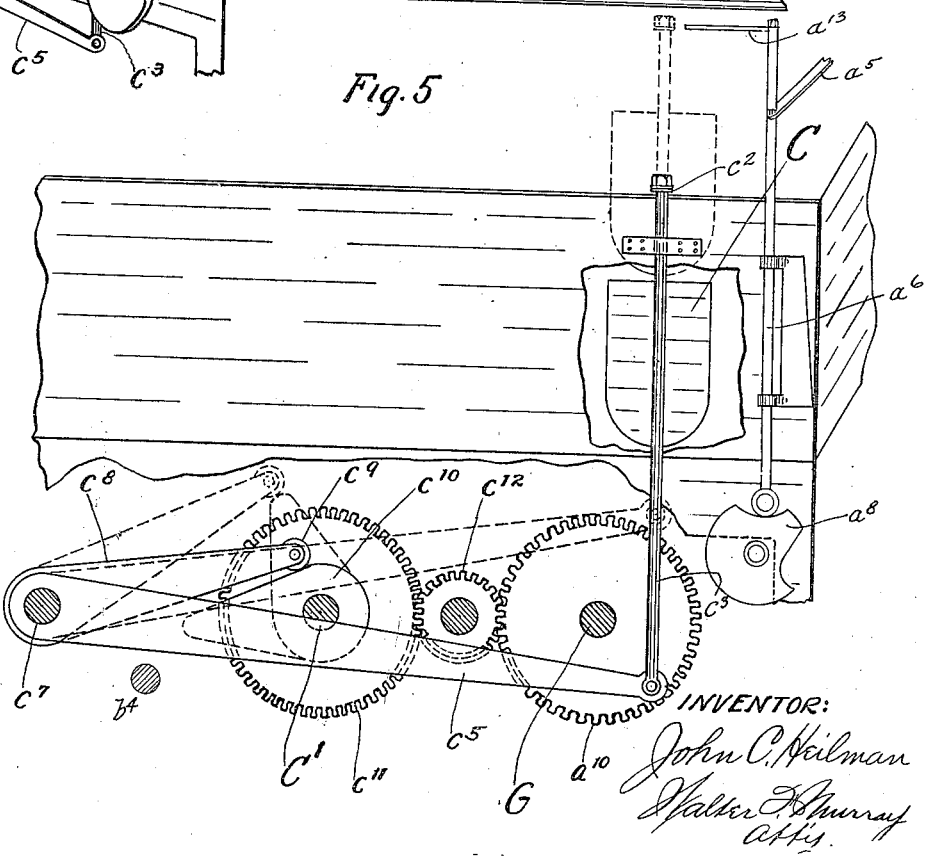
Fig. 5, is a view partly in side elevation and in section of the trough actuating mechanism, the side of the tank being shown partly broken away.
Figure 10:
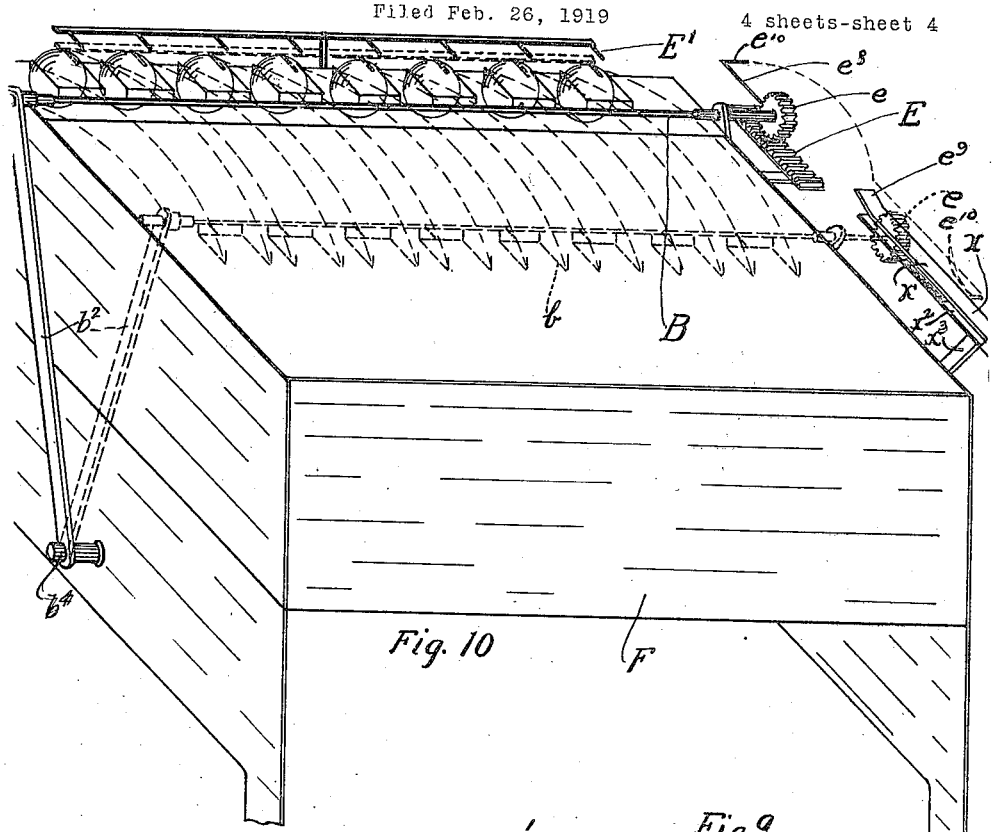
Fig. 10, is a perspective view of the means for inverting the conveyer, and of the mechanism for removing the bon-bons from the inverted conveyer.
Figures 9, 11:
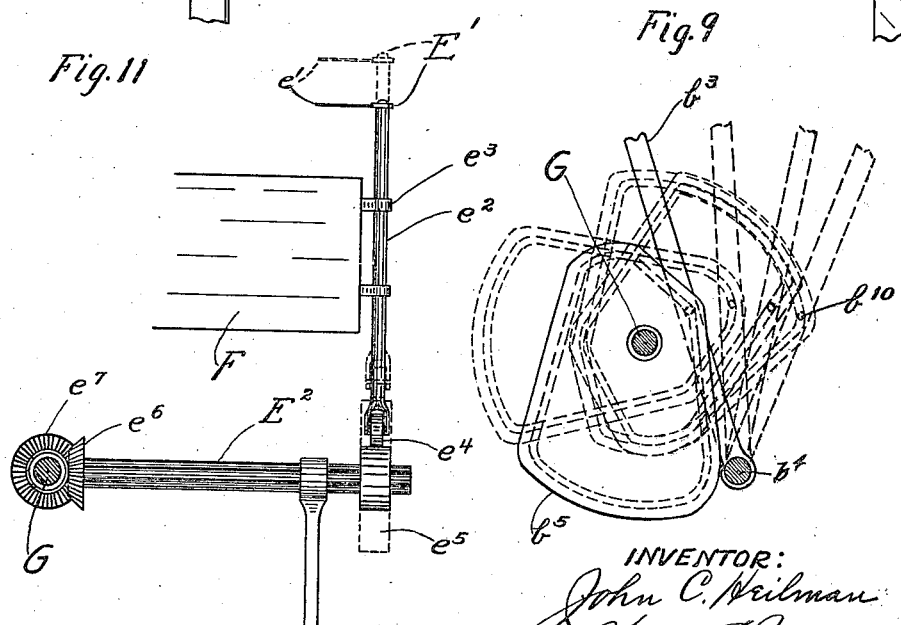
Fig. 9, is a side elevation of the cam, and of one of the conveyer arms, showing the different positions of these parts during the travel of the conveyer.
Fig. 11, is a detail view of the mechanism for moving the rake which assists in removing the bon-bons from the conveyer.

My machine comprises a bon-bon receptacle A, in which the attendant deposits the bon-bons $a$, which are to be coated, a conveyer B, which receives the bon-bons from the receptacle, a trough C which conveys the coating material and which is carried upward around the bon-bons in the conveyer and is then lowered, a shaking device D, for shaking the superfluous coating material from the bon-bons, a device E for inverting the conveyer and a rake E' for removing the bon-bons from the conveyer.

The receptacle for receiving the bon-bons consists of an open top box which is divided into a series of pockets or receptacles $a'$. The receptacle has a movable bottom $a^2$, extending beyond the rear wall of the receptacle and which is secured at one side to arms $a^3$, which are pivoted to the ends of the receptacle, and which are likewise pivoted upon one end of an arm $a^4$, the other end of which arm is secured to the end wall, of the tank F, which holds the liquid coating material. The arm $a^4$ may be made of a resilient or spring material adapted to yieldingly permit vertical reciprocation of the receptacle A, or the arm $a^4$ may be provided with a longitudinal slot accommodating the pivotal connection between itself and the receptacle, and in which the pivot may slide as the receptacle is reciprocated. Any other suitable means to accomplish this function may be employed. The bottom $a^2$ is so constructed that it forms the bottom for all the individual receptacles or pockets $a'$. Receptacle A is mounted upon a transverse bar $a^5$, which is secured at its ends to vertical arms $a^6$, which are mounted reciprocally upon the tank F, by means of brackets. Arms $a^6$, carry at their lower ends rollers $a^7$ which contact with cams $a^8$ upon a rotating shaft $a^9$, which is connected by gear wheels $a^{10}$—$a^{11}$, with the main drive shaft G, which may receive its rotation from any suitable source of power. In the present instance the drive shaft is shown driven by a chain of gears $g$, $g'$, $g^2$, $g^3$, from an electric motor, not shown. At their upper end shafts $a^6$ have rearwardly projecting arms $a^{13}$, $a^{14}$, which have stretched between their ends wires $a^{15}$, $a^{16}$, which are in vertical alignment with trough C, and are adapted to be brought to bear down upon the bon-bons in the baskets during the coating operation, by the action of cam $a^8$, and coiled spring $a^{17}$.

Conveyer rod B, has mounted upon it a series of wire baskets $b$, by means of a series of longitudinal wires $b'$, which hold the baskets in vertical alignment with the pockets in the receptacle A, when the conveyer is at the forward limit of its travel.

Rod B is mounted at the upper ends of arms $b^2$, $b^3$, the lower ends of which are pivoted upon a rod $b^4$, which is secured between the side walls and beneath the bottom of tank F. Arm $b^3$, carried a pin $b^{10}$, which fits into a groove in the cam $b^5$ which is mounted upon one end of drive shaft G, which has upon its opposite ends a mutilated gear $g^4$, which meshes with mutilated gear $g^5$, upon a stud shaft $g^6$ upon which the gear wheel $g^3$ is secured. The stud shaft $g^6$ is journalled in one of the side walls of the tank. The trough C has in one side a series of slots $c$, which come in alignment with the arms $b'$ which support the wire frames, so that when the trough is raised the frames carrying the bon-bons may enter it. Trough C is supported by end arms $c'$, upon rod $c^2$, which is secured at its ends to vertical rods $c^3$, $c^4$. Rods $c^3$, $c^4$, are pivoted at their lower ends to links $c^5$, $c^6$, which at their other ends are pivoted upon rod $c^7$ which is supported by tank F. Arm $c^5$, has secured to it an arm $c^8$, which carries at its outer end a roller $c^9$, which contacts with a cam $c^{10}$, which is mounted upon a shaft C' which is connected by gear wheels $c^{11}$, $c^{12}$ with a gear wheel $g^4$ upon drive shaft G.

The shaking mechanism comprises a lever D, which is fulcrumed upon a bracket $d$ which is mounted upon a standard $d'$ which is secured at the side of the tank. At its upper end there is a coiled spring $d^2$ which is secured between the upper ends of the standard $d$ and the lever D. The lower end of the lever D is in the path of a series of knobs $g^7$ which project from the outer face of the gear wheel $g^3$. The upper end of the lever D, is in the path of the end of rod B, which has a limited transverse movement in the rods $b^2$, $b^3$, by means of collars $b^7$, $b^8$, which are secured upon the rod B. Between collar $b^8$ and arm $b^3$, is a coiled spring $b^9$, which normally holds collar $b^7$ in contact with arm $b^2$, so that the end of the rod B is in the end of the path of the lever D.

The mutilated parts of the gears $g^4$, $g^5$, are disposed so that they register, just as the knobs $g^7$ upon the gear wheel come in contact with the lever D, and the rod B contacts with the lever D.

The means for inverting the frames $b$ for discharging the bon-bons therefrom is as follows:—Rod B, has secured upon one of its ends a gear wheel in whose path a rack E is mounted upon the side of the tank F. Rake E' for removing the bon-bons from the inverted baskets has fingers $e'$ which register with the baskets, and a handle $e^2$ which is mounted reciprocally in bracket $e^3$, secured to the rear end of the tank F. Its lower end carries a roller $e^4$ which contacts with the cam $e^5$ upon a shaft $E^2$, which carries bevel gear $e^6$ which meshes with a bevel gear $e^7$ which is secured upon the drive shaft G. The cam $e^5$ is positioned upon its shaft $E^2$ so that the rake is lowered upon the bon-bons after the baskets have been inverted upon the shelf F'. Guide wheel $e$ has secured to it a guide rod $e^8$, having a finger $e^{10}$ which upon the return movement of the conveyer enters the guide way $e^9$ in the guide, which is mounted upon the side of the tank, the function of the guide rod finger and the guide way being to steady the conveyer shaft B, so as to hold the baskets $b$, in horizontal positions. The guide X consists of two parallel or slightly curved concentric plates X' and $X^2$ supported by bracket $X^3$ extending from the tank F and forming a way $e^9$ between them. The finger $c^{10}$ is adapted to enter the way $e^9$.

In operation the attendant fills the pockets of the receptacle A with bon-bons to be coated, whilst the preceding lot of bon-bons is being carried by the conveyer through the operations of dipping, shaking and depositing upon the shelf. Upon the return of the conveyer to the position shown in full line in Fig. 1, the receptacle A is lowered by action of the spring $a^{17}$ upon the rod $a^6$, to the position shown in dotted line in Fig. 2, and the bottom $a^2$ of the pockets being open, as shown in dotted line in Fig. 3, when the receptacle A is moved downward by the action of cam $a^8$ and spring $a^{17}$, the arm $a^3$ turns upon the pivot by which it is affixed to arm $a^4$, thereby moving the bottom $a^2$ backward and away from the receptacle A, to the position shown in Fig. 3, in dotted lines, and the bon-bons drop on to the baskets $b$, and by movement of the cam $a^8$ against the roller $a^7$ receptacle A is moved to its uppermost position.

The groove in the cam $b^5$ then advances the conveyer to the first of the positions indicated by dotted lines shown in Fig. 1. The cams $a^8$, then lower the arms $a^6$ so as to cause wires $a^{15}$, $a^{16}$, to bear upon the bon-bons, and the trough C is carried upward by the arms $c^3$, $c^4$, so as to cause the trough to surround the baskets holding the bon-bons. Since the liquid is of a thick consistency, the wires $a^{15}$, $a^{16}$, are necessary to hold the bon-bons in place whilst they are being immersed. During this immersing operation the pin $b^{10}$ is passing through a circular part of the groove, the center of the circle being shaft G, so that the conveyer is stationary. The trough is then lowered by action of the spring $a^{17}$ and the cams $a^8$, and the conveyer is advanced to the second position as shown in dotted line in Fig. 1.

In this second position the end of rod B is brought in contact with the lever D, and the mutilated parts of the gear wheels $g^4$, $g^5$, register so that the drive shaft G becomes stationary and the conveyer is held stationary. The rotation of the gear wheel $g^3$ then causes the knobs $g^7$ to impart a transverse rapid vibration to the rod B, so that any superfluous fluid upon the bon-bons is shaken off into the tank F. Then the gear teeth of the gear wheels $g^4$, $g^5$, coming into mesh, the conveyer is carried to the third position indicated by dotted lines in Fig. 1, wherein the gear wheel e upon the rod B, engages rack E, which rotates the rod B and inverts the baskets b upon the shelf F'. Rake E' is then lowered upon the bon-bons, which are left upon the shelf when the conveyer is returned to its forward position by the action of the cam $b^5$.

What I claim is:—

1. In a machine of the class described the combination of a tank for holding a coating fluid, a conveyer adapted to hold the articles to be coated, means for moving the conveyer step by step above the tank, a trough adapted to carry the coating fluid from the tank and over the articles upon the conveyer, means for moving the trough and means adapted to remove the articles from the conveyer.

2. In a machine of the class described the combination of a tank for holding a coating fluid, a conveyer adapted to hold the articles to be coated, means for moving the conveyer step by step above the tank, a trough adapted to carry the coating fluid from the tank and over the articles upon the conveyer, a shaker for removing superfluous coating material from the articles, means adapted to move the trough, means adapted to oscillate the shaker and means adapted to remove the articles from the conveyer.

3. In a machine of the class described the combination of a tank for holding a coating fluid, a receptacle above the tank and having pockets adapted to hold confections to be coated and to deposit them upon a conveyer, the conveyer adapted to hold the articles, means adapted to move the conveyer step by step, a trough adapted to carry a coating fluid from the tank and over the articles upon the conveyer, means adapted to move the trough and means adapted to remove the articles from the conveyer.

4. In a machine of the class described the combination of a tank for holding a coating fluid, a conveyer, baskets mounted upon the conveyer and adapted to hold the articles to be coated, a trough adapted in its uppermost position to enclose the baskets and in its lowermost position to receive liquid from the tank, and means for reciprocating the trough.

5. In a machine of the class described the combination of a tank adapted to hold a coating fluid, a conveyer adapted to be reciprocated longitudinally of the tank, and comprising a support rod and wire baskets secured to the rod, and a trough adapted to be reciprocated from the interior of the tank across the path of the conveyer and means adapted to cause the conveyer and the trough to combine in applying the coating material to the articles located in the baskets.

6. In a machine of the class described the combination of a receptacle having pockets adapted to hold articles to be coated, a movable bottom for the receptacle, a conveyer having baskets adapted to be brought into vertical alignment with and beneath the pockets, means adapted to move the bottom simultaneously with the registration of the pockets and the baskets, and means to coat the articles deposited in the baskets.

7. In a machine of the class described the combination with a tank adapted to hold a coating fluid of an oscillating conveyer comprising a supporting rod and a series of baskets supported by the rod, means adapted to immerse the baskets in a coating fluid, means adapted to rotate the rod and to invert the baskets upon a receiver, and a receiver adapted to hold the coated articles.

8. In a machine of the class described the combination of a conveyer comprising a supporting rod and a series of baskets supported by the rod, means adapted to immerse the baskets in a coating fluid, means adapted to rotate the rod and to invert the baskets, a receiver, a rake, a means adapted to cause the rake to contact with the articles in the inverted baskets to deposit them upon the receiver.

9. In a machine of the class described the combination of a conveyer adapted to carry articles to be coated, means to coat the articles carried by the conveyer, a drive shaft adapted to actuate the conveyer, a mutilated gear adapted to impart an interrupted motion to the drive shaft, a lever adapted to contact with the conveyer and contact devices upon the mutilated gear adapted to contact with the lever whilst the drive shaft is inoperative, and whilst the lever engages the conveyer, whereby the lever and the conveyer are vibrated.

10. In a machine of the class described the combination of a conveyor for articles to be coated capable of oscillation, means to oscillate the conveyor, a receptacle for a coating fluid, means to immerse articles carried by the conveyor in the coating fluid, and means to remove articles from the conveyor, said two last mentioned means being disposed at substantially the opposite limits of oscillation of the conveyor.

11. In a machine of the class described the combination of a conveyor for articles to be coated capable of oscillation, means to oscillate the conveyor, a receptacle for a coating fluid, means to immerse articles carried by the conveyor in the coating fluid, means to remove articles from the conveyor, said two last mentioned means being disposed at substantially the opposite limits of oscillation of the conveyor, and means to impart a vibratory motion to the conveyor intermediate its limits of oscillation.

In testimony whereof, I have hereunto subscribed my name this 24th day of February, 1919.

JOHN C. HEILMAN.